UNITED STATES PATENT OFFICE.

HERMANN KRAFT, OF BASEL, SWITZERLAND, ASSIGNOR TO SOCIETY OF CHEMICAL INDUSTRY IN BASLE, OF BASEL, SWITZERLAND.

GREEN VAT DYE AND PROCESS OF MAKING SAME.

960,098.     Specification of Letters Patent.     Patented May 31, 1910.

No Drawing.     Application filed May 4, 1909. Serial No. 493,903.

*To all whom it may concern:*

Be it known that I, HERMANN KRAFT, doctor of philosophy and chemist, a subject of the Emperor of Austria-Hungary, and resident of Basel, Switzerland, have invented new Green Vat Dyestuffs and a Process of Making Same, of which the following is a full, clear, and exact specification.

I have found that by the action of an indoxylic compound, such as indoxyl or acetindoxyl, on an alpha-substitution product of the betanaphthisatin of the general formula

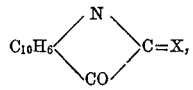

such as monobromo-betanaphthisatin chlorid, dibromobetanaphthisatin chlorid, betanaphthisatin-naphthalid, new condensation products are obtained which can be transformed by their subsequent treatment with halogenizing agents into new green vat-dyestuffs of excellent fastness to washing, light and chlorin.

The manufacture of these dyestuffs is illustrated by the following example: 29.4 parts of mono-bromo-betanaphthisatin chlorid (made by the treatment of monobromo-betanaphthisatin with phosphorus pentachlorid in presence of pentachloretane), 17.5 parts of acetindoxyl, or the corresponding quantity of indoxyl, and 10–20 parts of anhydrous sodium carbonate are heated together with 800–1000 parts of alcohol to boiling for a long time, care being taken to avoid access of air as far as possible. When the condensation is complete, the whole is allowed to cool, and the condensation product which has separated is filtered off and washed successively with alcohol and hot water; the new dyestuff is thus obtained as a greenish black powder. It dissolves in concentrated sulfuric acid to a bluish green solution, which, when warmed, becomes first reddish blue and then violet. When the warmed sulfuric acid solution is introduced into water, a sulfonic acid separates as dark blue flocks, the said sulfonic acid being difficultly soluble in hot water and dyeing wool blue tints. With alkaline reducing agents the dyestuff yields an orange colored vat dyeing cotton dark green tints. The dyeings are satisfactorily fast to washing, light and chlorin. But, if the dyestuff is subsequently treated with bromin, there is obtained a product which yields on cotton dyeings that are somewhat more bluish than those obtained from the original dyestuff and show a somewhat greater fastness to washing and chlorin. This brominating of the dyestuff may be carried out as follows: 1 part of the dyestuff is suspended in 5 to 6 parts of nitrobenzene, 1.5 parts of bromin are added and the mixture is first allowed to remain at ordinary temperature for about 12 hours. It is then warmed for some time longer at 100 to 120° C. After cooling, the mass is filtered and the solid matter on the filter is washed with alcohol. This brominated product forms a greenish black powder, soluble in concentrated sulfuric acid to an olive green solution; by treatment with caustic soda lye and a hydrosulfite it yields an orange colored vat which dyes cotton full, blue-green tints.

The new dyestuffs can also be used for dyeing wool.

What I claim is:

1. The herein described process for the manufacture of green vat-dyestuffs by condensing an indoxylic compound with an alpha-substitution product of the betanaphthisatin of the general formula

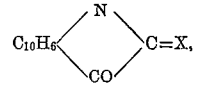

and treating the so-obtained condensation product with a halogenizing agent.

2. The herein described process for the manufacture of green vat-dyestuffs by condensing an indoxylic compound with an alpha-substitution product of the betanaphthisatin of the general formula

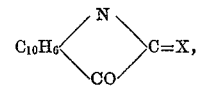

and treating the so obtained condensation product with bromin.

3. The herein described process for the manufacture of green vat-dyestuffs by condensing an indoxylic compound with an alpha-substitution product of the betanaphthisatin of the general formula

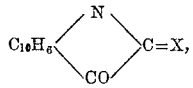

4. As new products, the described halogenated green vat-dyestuffs derived from the condensation products of indoxylic compounds with alpha-substitution products of betanaphthisatin, the said dyestuffs being in dry state greenish black powders, soluble in concentrated sulfuric acid to a green solution and yielding by their treatment with caustic soda-lye and a hydrosulfite an orange colored vat which dyes cotton green tints fast to washing, light and chlorin.

5. As a new article of manufacture, the described brominated green vat-dyestuff derived from the condensation product of acetindoxyl with mono-bromo-betanaphthisatin chlorid, the said dyestuff being in dry state a greenish-black powder soluble in concentrated sulfuric acid to an olive green solution and yielding by its treatment with caustic soda lye and a hydrosulfite an orange vat, which dyes cotton full, blue-green tints fast to washing, light and chlorin.

In witness whereof I have hereunto signed my name this 22nd day of April 1909, in the presence of two subscribing witnesses.

HERMANN KRAFT.

Witnesses:
  GEO. GIFFORD,
  AMAND RITTER.